May 27, 1958     B. H. SAGE     2,836,234
ANNULUS TYPE BURNER FOR THE PRODUCTION OF SYNTHESIS GAS
Filed Nov. 25, 1955
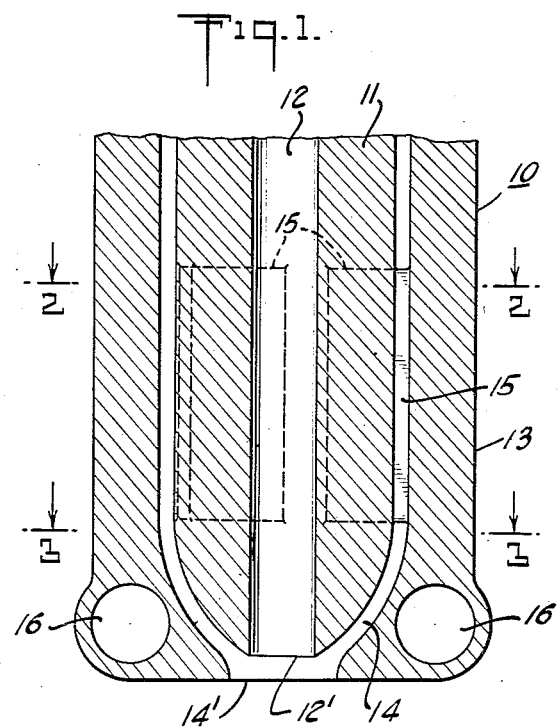
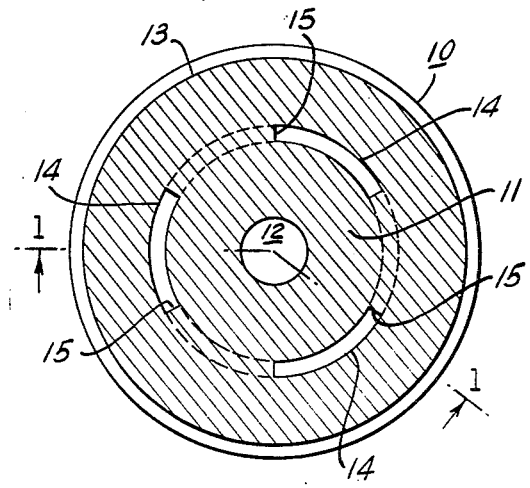
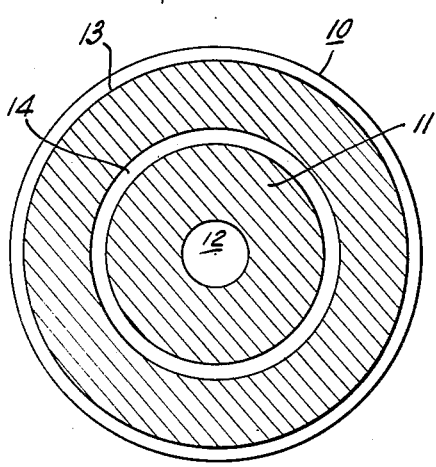

United States Patent Office 2,836,234
Patented May 27, 1958

2,836,234

ANNULUS TYPE BURNER FOR THE PRODUCTION OF SYNTHESIS GAS

Bruce H. Sage, Altadena, Calif., assignor to Texaco Development Corporation, New York, N. Y., a corporation of Delaware Application November 25, 1955, Serial No. 549,073

2 Claims. (Cl. 158—116)

This invention relates generally to an apparatus for the production of synthesis gas by partial combustion of gasiform hydrocarbons, and particularly to the generation of carbon monoxide and hydrogen from the partial combustion of a gaseous hydrocarbon and enriched air or relatively pure oxygen.

This application is a continuation-in-part of copending application Serial Number 244,358, filed August 30, 1951, now abandoned.

Synthesis gas mixtures consisting essentially of carbon monoxide and hydrogen are commercially important as a source of hydrogen for hydrogenation reactions and as a source of feed gas for the synthesis of hydrocarbons, oxygen-containing organic compounds and ammonia and other purposes. At the present time, there is a great deal of interest in the production of carbon monoxide and hydrogen from the partial combustion of a hydrocarbon with an oxygen-rich gas, especially the reaction wherein a gaseous hydrocarbon, such as methane or natural gas, is reacted with oxygen-enriched air or relatively pure oxygen.

The partial combustion of a hydrocarbon fuel with oxygen-enriched air or with relatively pure oxygen to produce carbon monoxide and hydrogen presents unique problems not normally encountered in the burner art. For example, it is necessary to effect very rapid and complete mixing of the reactants, as well as to take special precautions to protect the burner, or mixer, from overheating. In this connection, it is a prerequisite that the reaction between the hydrocarbon and oxygen-rich gas take place entirely outside the burner proper and to prevent localized concentration of combustible mixtures at or near the surface of the burner elements. And even though the reaction takes place beyond the point of discharge from the burner, the burner elements are subjected to heating by radiation therefrom. Because of the reactivity of oxygen with the metal from which a suitable burner may be fabricated, it is extremely important to prevent the burner elements from reaching those temperatures at which their rapid oxidation takes place.

Inadequate mixing results in concentrations of oxygen in localized areas so that relatively complete combustion of a portion of the hydrocarbon fuel takes place there, thus releasing large quantities of energy and so tending to overheat the burner elements by radiation. In addition, regardless of the type of burner construction employed, eddies of the reactant gases form combustible mixtures adjacent the surface of the burner. Unless these surfaces are maintained at a temperature below the ignition temperature of the mixture, they act as flame holders, with the ensuing combustion along the surfaces soon causing the overheating and failure of the burner element.

Another problem peculiar to this partial combustion reaction is the tendency for free carbon to form either on the burner or within the reaction space, due primarily to inadequate mixing of the gases. The formation of carbon on the surfaces of the burner often leads to burner failure, since it interferes with the mixing of the gases which with localized concentrations of oxygen will overheat burner surfaces or associated refractory.

With conventional burners, it has been found necessary to use a quantity of oxygen in excess of the theoretical to prevent carbon formation. Often this causes undesirably high reaction temperatures and aggravates the problem of cooling the burner. Steam is sometimes used to control the reaction temperature and hold it at a reasonable level. The problem of cooling is further increased by the fact that in the partial combustion of gases, it is desirable to charge the reactant gases to the burner in a highly preheated state to reduce the oxygen requirements and give a maximum yield of the desired product gas.

Conventional burners for use in the generation of carbon monoxide and hydrogen in commercial quantities from the partial combustion of natural gas and oxygen-rich gas are unsatisfactory for one or more reasons described above. Generally, these burners are characterized by failure of burner elements, particularly by burning away of metal at the burner tips even when these elements have been water cooled.

In view of the foregoing discussion, the type of burner in which reactant gases are premixed and injected from the burner at rates of flow in excess of the rate of flame propagation suggests itself. This type of burner has not proven satisfactory, however, for use with hydrocarbons and oxygen-rich gas because of the ever present film of slow moving gases along the surface of the conduit or orifice through which they are discharged. The highly reactive oxygen-hydrocarbon mixture reacts along this film on the surface, soon causing failure of the burner.

The present invention relates to burners in which the reactants are mixed at the point of discharge from the burner and specifically to burners of the annulus type, wherein streams of reactant gases are introduced through concentric conduits, one stream of the gases being discharged from a central conduit into admixture with another gas stream which is discharged as an envelope from the annular passageway between the central conduit and a surrounding exterior conduit.

Contrary to prior practices, the burner of this invention involves the mixing of contiguous streams of reactant gases flowing in the same general direction as relatively small streams. Small eddies are formed at the interfacial boundary after which, mixing of the reactant gases takes place primarily as the result of diffusion between the eddies. This gives superior performance for the burner, not obtainable by the conventional practice of injecting streams of gases into intersecting relationship with one another and forming large eddies. The reaction following from the diffusion between the small eddies is characterized by relative freedom from carbon formation, as contrasted with impingement type burners operated under comparable conditions.

A suitable burner srtucture for carrying out the invention is shown in the acompanying drawings wherein:

Fig. 1 is a longitudinal cross section taken along line 1—1 of Fig. 2;

Fig. 2 is a cross section taken along line 2—2 of Fig. 1; and

Fig. 3 is a cross section taken along line 3—3 of Fig. 1.

With reference to the figures of the drawing, the burner body, indicated generally at 10, comprises an inner conduit member 11 with an unobstructed cylindrical passageway 12 for the passage of a stream of gaseous reactant, and an outer conduit member 13, generally cylindrical in shape surrounding the inner conduit member and spaced uniformly therefrom, thus defining an annular passageway 14 for the passage of a second stream of gaseous reactant between the annular space defined by the inner and outer conduit members. The inner member 11 is spaced from the outer member 13 by a plurality of webs 15 which serve to hold the members in spaced relationship to one another as well as serving as heat transfer bridges. Though the burner is disclosed as a unitary structure, it may be fabricated from a number of elements.

The outer surface at the discharge end of the inner conduit member 11 converges convexly to meet the inner surface thereof bounding passageway 12 to define an inner discharge orifice 12' of circular configuration. A cross section through the convexly converging surface in the plane through the cylindrical axis of the inner member 11 shows a circular arc, with a radius of curvature at least equal to twice the wall thickness of the inner conduit member. The inner surface at the discharge end of the outer conduit member 13 converges concentrically with the convexly converging outer surface of the inner conduit member 11 up to the plane normal to the axis of passageway 12 and passing through the discharge orifice 12' and then reversely curving up to the plane perpendicular to the same axis, where the inner surface of the outer conduit member becomes parallel to the axis of passageway 12, to bound an annular passageway 14 of substantialy constant width, and ending in an outer discharge orifice 14' of circular configuration. The diameter of this discharge orifice 14' is equal to twice the sum of the radius of the inner orifice 12' and the width of the annular passageway 14. A cross section through the reversely curving section and the cylindrical axis of the conduit members shows as a circular arc having a radius of curvature located from perpendiculars erected to the tangents to the inner surface of the outer member at the points of intersection with the respective perpendicular planes.

A passageway 16 in the outer conduit member 13 of the burner body surrounding the outer orifice 14' provides for the cooling of the burner face by a stream of cooling liquid passing therethrough from a suitable source of supply, not illustrated in the drawing, and continuously discharged therefrom.

Operation of the disclosed burner has confirmed modern day theories regarding the mixing of gas streams. According to these theories, the mixing of two adjoining gas streams takes place largely as a result of eddy diffusion at the interface of the two streams with the degree of intermixture being influenced by:

(1) The thickness of the outer envelope of gaseous reactant (when provided by an annulus or analogous type burner);

(2) The area of interface between the gaseous reactants; and (3) The relative and actual velocities of the adjoining streams of gaseous reactants.

(4) Level of turbulence of stream.

When annulus type burners are operated with natural gas as the envelope surrounding the oxygen-rich gas, the use of a low velocity, thick gas envelope, or of a large diameter oxygen-rich central stream, both of which give low relative interfacial areas for a given volume of gas, results in poor mixing, as evidenced by the formation of a large amount of carbon, some of which may be deposited on the burner proper and which ultimately will cause its failure.

The burner structure disclosed has been designed with a number of unique features to overcome the shortcomings of the prior art annulus type burners, and these cover the following:

(a) When the diameter of the central passageway, which usually provides oxygen, is small, then a relatively large number of burners must be used to release a given quantity of oxygen. The advantage in the use of a large number of small diameter burners rather than a small number of large burners lies in the increase of the interfacial areas of the gases to be mixed, and a decrease in the thickness of the streams involved.

(b) When the central passageway is designed as a straight nozzle to smooth the flow of the stream of the issuing gaseous reactant, e. g. oxygen, flow with a large scale of turbulence, which resulted from the use of previous designs, is minimized. For the greatest effectiveness in this connection, the length of the straight portion within the central passageway has been found to be not less than four times and not more than ten times the diameter of the jet, with a prefererd ratio of 6.

(c) In order to keep the thickness of the outer gas envelope as low as possible, it is highly desirable that it should not be more than ¼ the diameter of the central passageway, with the preferred dimension for the central passageway being less than ½". Attempts to increase the dimensions of the burner proportionally beyond this measurement have not been successful.

(d) The area of the outer discharge orifice should be such as to accommodate without restraint the flow discharge from both the central and annular passageway, i. e., the diameter of the outer discharge orifice should be equal to the sum of the diameter of the central passageway and twice the width of the annular passageway. If this dimension of the outer discharge orifice should be smaller, then it would be necessary for the natural gas to displace some of the oxygen at the discharge orifice, resulting in the creation of extreme turbulence and so reduction in the effective interface between the two gaseous reactants.

(e) Optimum use of the interfacial areas requires that the two streams should follow smoothly along with each other. For this reason, the outer discharge orifice is rounded to avoid creation of turbulence on the exterior of the annular stream of gaseous reactant. Because of the directive flow of the outer annular stream of gaseous reactant, there will be inevitably some turbulence at its juncture with the central oxygen stream which occurs as "fine grain" turbulence and is required for the interdiffusion of small eddies rather than gross mixing of the reactants by impinging one stream into another.

(f) The burner has cooling means which include ligament cooling utilizing heat transfer from the inner conduit member by the spacing webs, as well as the cooling liquid adjacent the outer discharge opening.

In the operation of the burner, one of the reactant gases is introduced through the central passageway of the burner and the other through the annular passageway to form an envelope. The reactant gases are merged through "fine grain" turbulence, which takes place primarily as the result of diffusion between small eddies, and discharged from the burner into an appropriate reaction zone, not illustrated in the drawing. Either the oxygen containing gas or the hydrocarbon gas may be discharged from the central passageway, and preferably the former.

The velocity of flow of the reactant gas streams may range from about 75 to about 600 feet per second. It is desired that velocities of the reactant gas streams be substantially equal and within the range of from about 150 to 300 feet per second.

While the burner described herein is particularly applicable to the generation of carbon monoxide and hydrogen, it is suitable also for the production of acetylene by the controlled reaction between a hydrocarbon and an oxygen-containing gas. In the production of acetylene, the reaction is quenched in a definite short time. Numerous methods of quenching or stopping the reaction are known in the art. The intimate mixing afforded by the burners of this invention are particularly suited to the reaction, providing a quick, uniform mixing of the reactants.

Obviously many modifications and variations of the

I claim:

1. An apparatus for the production of carbon monoxide and hydrogen from the partial combustion of a gasiform hydrocarbon comprising a burner structure for discharging and mixing separate streams of a gasiform hydrocarbon and an oxygen-containing gas which comprises a substantially cylindrical inner conduit member having an unobstructed central passageway of uniform diameter extending axially thereof and ending in an inner discharge orifice for the passage therethrough and discharge therefrom of one of said streams, the outer surface of said inner conduit member at its discharge end having a convexly curved section of gradually reduced diameter merging into said orifice, the cross section of said curved section in a plane through the cylindrical axis of said inner conduit member showing as a circular arc extending from the outer cylindrical surface to said orifice, a substantially cylindrical outer conduit member coaxially surrounding said inner member and spaced therefrom in permanently fixed relationship to form an annular passageway of uniform width for the passage therethrough of the other of said streams, said outer conduit member extending beyond the discharge end of said inner conduit member and terminating in a circular outer discharge orifice having a diameter equal to twice the sum of the radius and width respectively of the central and annular passageways, the inner surface of said outer conduit member adjacent said convexly curved portion of said inner conduit member being concentric therewith and curving and converging toward the axis of said conduit members in uniformly spaced relationship to said outer surface of said inner conduit member up to the plane normal to said axis and through said inner discharge orifice and then reversely curving up to the plane perpendicular to said axis at which said inner surface of said outer conduit member becomes parallel to said axis, a cross section of the reversely curving inner surface in a plane through the cylindrical axis of said members showing as a circular arc whereby the exterior surface of the stream provided by said annular passageway is relatively undisturbed, said annular passageway being reduced uniformly beginning at the plane through the start of the convexly curving section of said outer surface of said inner conduit member whereby the rate of flow of the stream provided thereby is increased uniformly and said streams are merged through fine grain turbulence from from diffusion of small eddies along the interface of said streams and discharged into an appropriate reaction zone, said central passageway having a diameter not more than ½ inch, and said annular passageway having a width not greater than one-fourth the diameter of said central passageway.

2. In a burner structure as defined in claim 1, said inner and outer conduit members being maintained in spaced relationship by a plurality of webs adjacent said discharge end of said inner conduit member, said outer conduit member having a passageway for cooling liquid at its discharge end adjacent the reversely curving surface thereof, whereby said discharge end of said inner conduit member is cooled by heat transfer through said webs to said cooling liquid in said passageway of said outer conduit member.

References Cited in the file of this patent

UNITED STATES PATENTS

| 1,774,306 | Werner | Aug. 26, 1930 |
| 2,395,614 | Csepely | Feb. 26, 1946 |

FOREIGN PATENTS

| 903,659 | France | Jan. 29, 1945 |